(12) United States Patent  
Walls-Manning et al.

(10) Patent No.: US 7,630,783 B2
(45) Date of Patent: Dec. 8, 2009

(54) COMMUNICATING MOLD/PART MANUFACTURABILITY ISSUES

(75) Inventors: Christopher Walls-Manning, Ramsey, MN (US); Kevin R. Crystal, Chanhassen, MN (US); John M. Gilbert, St. Paul, MN (US)

(73) Assignee: Proto Labs, Inc., Maple Plain, MN (US)

( * ) Notice: Subject to any disclaimer, the term of this patent is extended or adjusted under 35 U.S.C. 154(b) by 318 days.

(21) Appl. No.: 11/338,052

(22) Filed: Jan. 24, 2006

(65) Prior Publication Data

US 2006/0173566 A1 Aug. 3, 2006

Related U.S. Application Data

(60) Provisional application No. 60/648,752, filed on Feb. 1, 2005.

(51) Int. Cl.
*G06F 19/00* (2006.01)
(52) U.S. Cl. .......................................... 700/98; 700/200
(58) Field of Classification Search ................. 700/200, 700/98, 182, 97; 264/401; 705/26–28
See application file for complete search history.

(56) References Cited

U.S. PATENT DOCUMENTS

| | | | |
|---|---|---|---|
| 5,392,283 A * | 2/1995 | Bocci et al. ................. 370/329 |
| 5,572,639 A * | 11/1996 | Gantt ........................ 345/651 |
| 5,812,402 A | 9/1998 | Nishiyama et al. | |
| 5,838,328 A | 11/1998 | Roller | |
| 6,096,088 A | 8/2000 | Yu et al. | |
| 6,192,327 B1 | 2/2001 | Nishiyama et al. | |
| 6,219,055 B1 | 4/2001 | Bhargava et al. | |
| 6,327,553 B1 | 12/2001 | Nishiyama et al. | |
| 6,408,217 B1 | 6/2002 | Nishiyama et al. | |
| 6,618,643 B2 | 9/2003 | Nishiyama et al. | |
| 6,701,200 B1 * | 3/2004 | Lukis et al. ................... 700/98 |
| 6,836,699 B2 | 12/2004 | Lukis et al. | |
| 6,941,000 B2 * | 9/2005 | Wong ......................... 382/113 |
| 7,249,250 B1 * | 7/2007 | Akasaka et al. ................. 713/1 |
| 7,283,975 B2 * | 10/2007 | Broughton .................... 705/28 |
| 7,359,840 B2 * | 4/2008 | Akasaka et al. ................. 703/1 |
| 2003/0172205 A1* | 9/2003 | Bastian ........................ 710/45 |
| 2004/0158340 A1* | 8/2004 | Fischer et al. ................. 700/97 |
| 2004/0187714 A1* | 9/2004 | Napadensky et al. .......... 101/35 |
| 2007/0250199 A1* | 10/2007 | Akasaka et al. ............... 700/97 |

* cited by examiner

*Primary Examiner*—Kidest Bahta
(74) *Attorney, Agent, or Firm*—Shewchuk IP Services, LLC; Jeffrey D. Shewchuk

(57) ABSTRACT

A computer program analyzes a CAD file provided by a customer of a custom part to be injection molded. Feedback from the analysis is provided to the customer through a rendering of the part. Rather than merely communicating using color as applied to the rendering file and separate text, the invention applies one or more symbols as "decals" to the rendering of the part provided to the customer. In one preferred embodiment, the symbols are chevrons or arrows which indicate the direction of additional draft needed on particular faces for the part to be sufficiently manufacturable. The symbols are sized appropriately for the size of the face to which they are applied, and are oriented to match the orientation of the face. The symbols may also indicate other information, such as the magnitude of draft needed, magnitude of thickness required, the surface finish to be applied at that location, or time or location based properties of the injection molding process.

22 Claims, 8 Drawing Sheets

US 7,630,783 B2

COMMUNICATING MOLD/PART MANUFACTURABILITY ISSUES

CROSS-REFERENCE TO RELATED APPLICATION(S)

This application claims priority from provisional application No. 60/648,752, filed Feb. 1, 2005.

BACKGROUND OF THE INVENTION

The present invention relates to the field of mold making, and particularly to the manufacture of molds, such as for use with injection molding presses, from blocks of metal. More specifically, the present invention relates to software supported methods, systems and tools used in the design and fabrication of molds for custom plastic parts, and in presenting information to customers to help the customer design parts which minimize the cost of the mold and the cost of using the mold to produce the customer's part.

Injection molding, among other types of molding techniques, is commonly utilized to produce plastic parts from molds. Companies and individuals engaged in fabricating molds are commonly referred to as "moldmakers." The moldmaking art has a long history of fairly gradual innovation and advancement. Molds are designed pursuant to a specification of the part geometry provided by a customer; in many cases, functional aspects of the plastic part also need to be taken into account. Historically, moldmaking involves at least one face-to-face meeting between the moldmaker and the customer, with complex communication between the moldmaker and the customer and complex decisions made by the moldmaker regarding the construction of the mold. More recently, this process has been automated to a significant degree, to assist in transmitting information between the moldmaker and/or the moldmaker's computer system and the customer, thereby realizing significant efficiencies and corresponding price reductions in the manufacture of molds and custom molded parts. Such automation is described in U.S. patent application Ser. Nos. 11/114,893, 11/074,388, 11/035,648, 10/970,130, 10/325,286 (now issued as U.S. Pat. No. 6,836,699), and Ser. No. 10/056,755 (now issued as U.S. Pat. No. 6,701,200). While such software and automated methods have revolutionized the moldmaking process, additional benefits still can be obtained by creative and non-obvious modifications.

BRIEF SUMMARY OF THE INVENTION

The present invention is a process, computer program and system for communicating with a customer with regard to an injection molded part. A CAD file of the part is provided by a customer and analyzed. Feedback from the analysis is provided to the customer through a rendering of the part. Rather than merely communicating using color as applied to the rendering file and separate text, the invention applies one or more symbols as "decals" to the rendering of the part provided to the customer. In the preferred embodiment, the symbols indicate the direction of additional draft needed on particular faces for the part to be sufficiently manufacturable.

Figure 1:
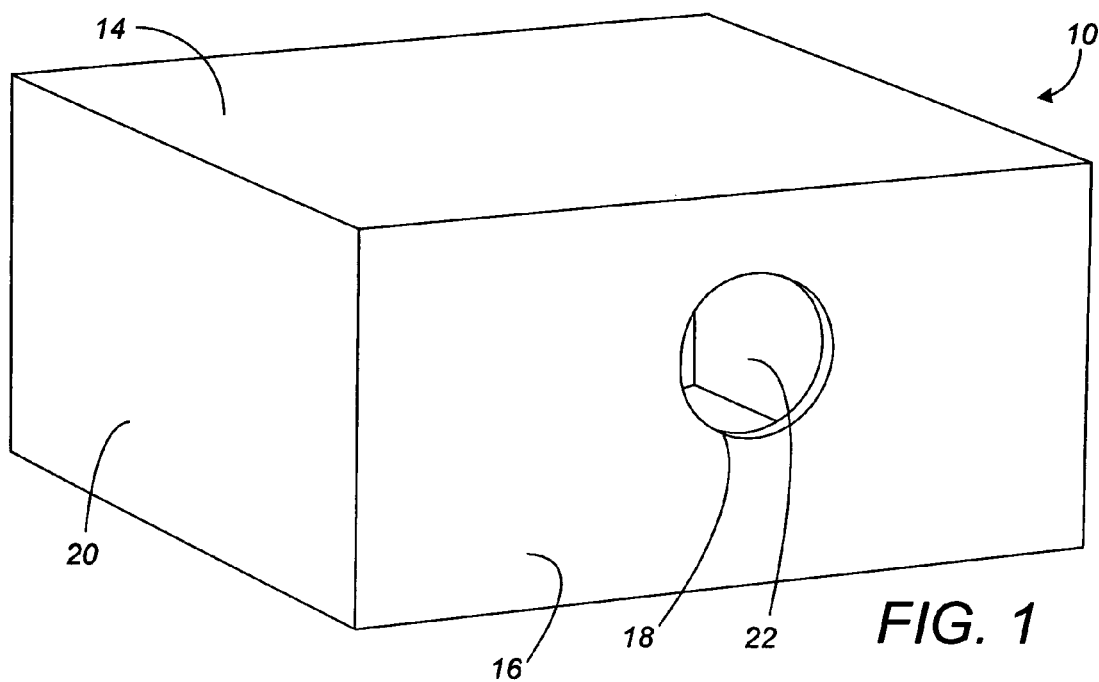
FIG. 1 is a perspective view of an exemplary "box" part desired by a first customer.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

The present invention will be described with reference to exemplary parts including a box part 10 shown in FIG. 1 and rendered in FIGS. 2-4 and 9-11, and a labeled part 12 rendered in FIGS. 5-8. The box part 10 is designed by the customer. In part because the box 10 is custom-designed (i.e., not a staple article of commerce) by or for this particular customer, the box 10 includes features which have no commonly accepted names. For purposes of discussion, we will give names to several of these features, including a top wall 14, a front wall 16 with a circular opening 18, and side walls 20, 22. The front wall 16 and the side walls 20, 22 extend perpendicular to the top wall 14. However, workers skilled in the art will appreciate that the customer may m fact have no name or may have a very different name for any of these features. Further, the software systems of the present invention are recorded on a computer readable medium and designed and implemented to handle an infinite variety of parts custom designed by customers, i.e., the software systems are finalized without knowledge of the shape of the parts which will be analyzed and rendered by the systems.

Figure 2:
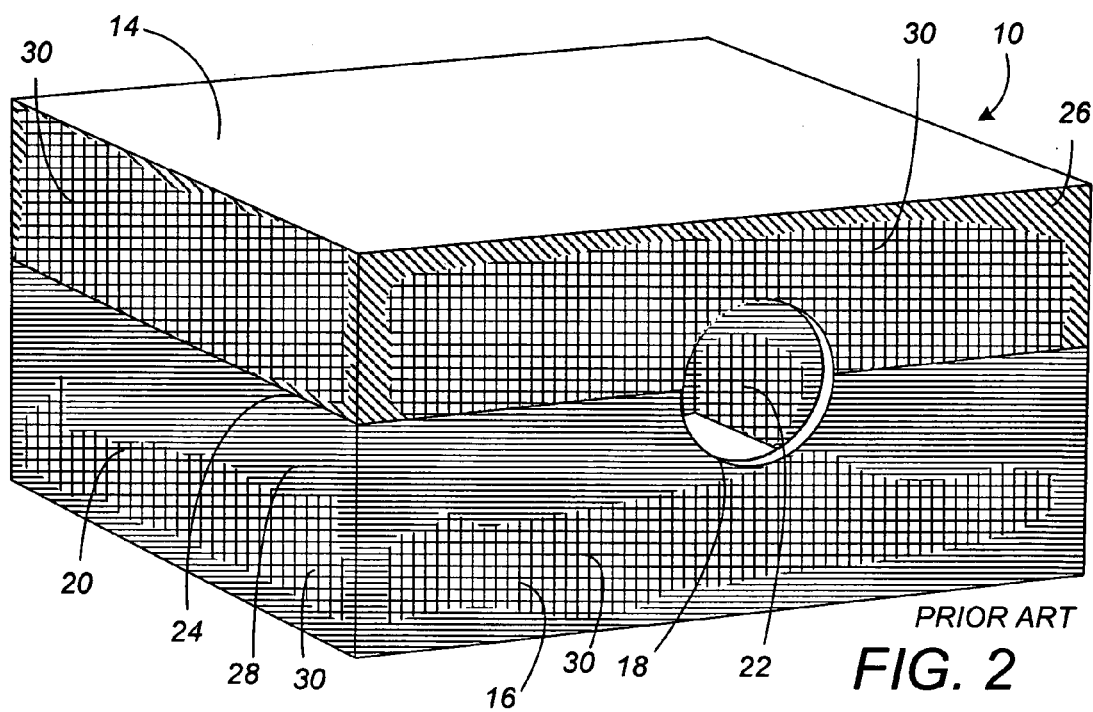
FIG. 2 is a perspective rendering of the box part provided by the PROTOMOLD system described and claimed in U.S. Pat. Nos. 6,836,699 and 6,701,200.

The present invention is particularly contemplated for use in enhancing the methods and structures disclosed in U.S. patent application Ser. Nos. 11/114,893, 11/074,388, 11/035,648, 10/970,130, 10/325,286 (now issued as U.S. Pat. No. 6,836,699), and Ser. No. 10/056,755 (now issued as U.S. Pat. No. 6,701,200), and provisional patent no. 60/736,597, all incorporated by reference. A rendering of the box part 10 provided by the systems and structures disclosed in U.S. Pat. Nos. 6,701,200 and 6,836,699 is shown in FIG. 2. In this prior art rendering, the box part 10 has been analyzed with a computer processor to determine a parting line 24 between the A side and the B side of the mold. A side action is used to create the circular opening 18, and the parting line 24 horizontally bisects the circular opening 18. The customer is returned a CAD rendering of the part 10 which shows the portion 26 created by the A side of the mold generally in a green color and the portion 28 created by the B side of the mold generally in a blue color.

The customer has designed the box 10 with inside and outside faces of the side walls 20, 22 and front wall 16 all extending perpendicular to the plane of the top wall 14. However, such a design for the box part 10 fails a draft angle assessment of a straight pull manufacturability criterion. The prior art rendering identifies the portions failing the straight pull manufacturability criterion and indicates those portions 30 on the computer rendering of the part by highlighting with yellow shading. Areas of the part that require additional draft are thus displayed to the customer through a rendering of the customer's part that colors portions of the face.

The prior art system may provide further information by highlighting using gradient shadings (not shown) on the rendering to show the magnitude and location that additional draft is needed. Yellow shading is used to indicate areas on faces that require at least 0.5 degrees of draft added, orange/brown coloring is used to indicate areas on faces that require at least 1.0 degrees added, and gray/transparent areas are areas used to indicate areas on faces that would still be unreachable or unmillable with the common toolset, no matter how much draft is added.

The present invention enhances the existing feature of displaying to the customer a rendering of the customer's part that highlights areas of their part that require additional draft added to faces by coloring parts of the face. The invention applies indicia on the rendering of the customer's part to the face requiring change, thereby providing even more information to the customer in a format which is more usable. The additional information can be instrumental in helping inexperienced customers understand the existing problem and make the appropriate changes more easily.

The indicia could be text added to the drawing, but more preferably it is a symbol provided as a "texture" or "decal" applied over the customer's model/part. For example, the decal may be used to show the direction that the customer needs to draft the face. Failure to understand the direction to draft the face is a very common problem for inexperienced customers. The direction of draft needed is based upon the pull direction for the A and B sides of the mold, but many inexperienced customers do not readily identify parting lines and pull directions.

Figure 3:
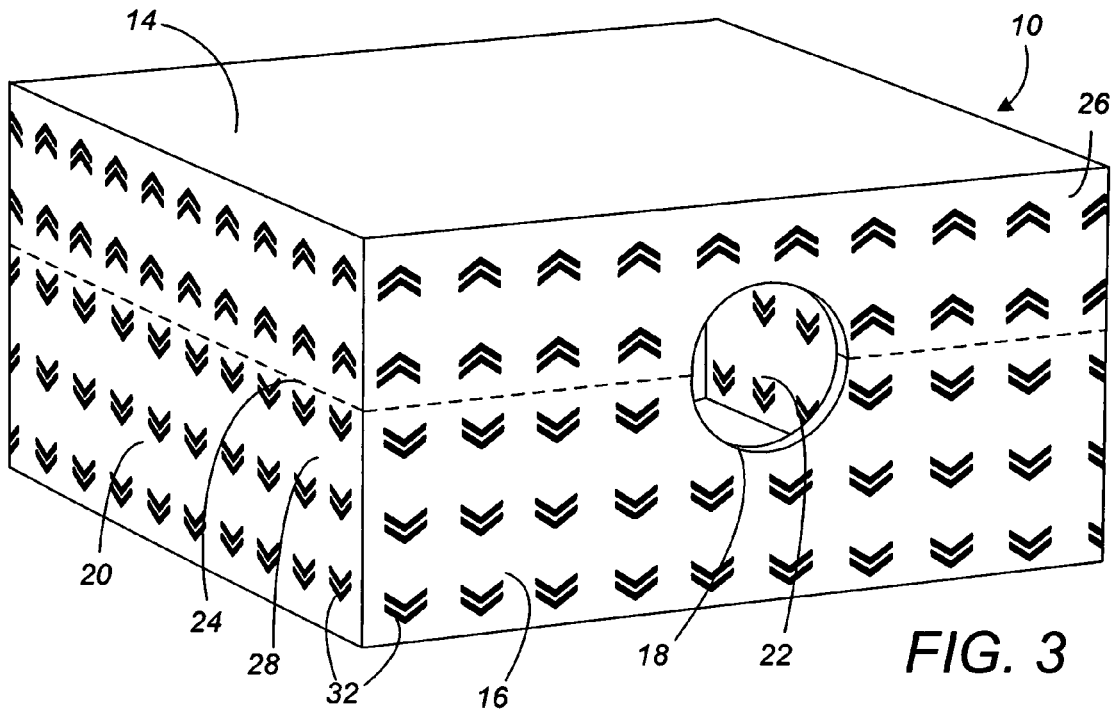
FIG. 3 is a perspective rendering of the box part in accordance with a first embodiment of the present invention.

FIG. 3 is a rendering of the same box part 10 as FIGS. 1 and 2, showing the invention. Chevron or arrow symbols 32 have been applied to the rendering. If desired, the symbols 32 added may merely identify which are the A and B portions of the mold as applied to the box part 10. More preferably, the arrow symbols 32 tell customers that the entire face must be drafted, rather than just those places in the middle of the face which caused the draft analysis to fail. Secondly, the direction of the arrow symbols 32 tells customers which way the pull direction is headed and which way the face should angle. The system may also provide explanatory text with these images.

If desired, the invention may be applied merely as part of a two dimensional rendering of the part 10 provided to the customer for viewing by the customer. More preferably, the rendering including the decals 32 is provided as a three-dimensional rendering in which the customer can move and rotate the model, with the decals 32 moving and rotating with the part 10.

Figure 4:
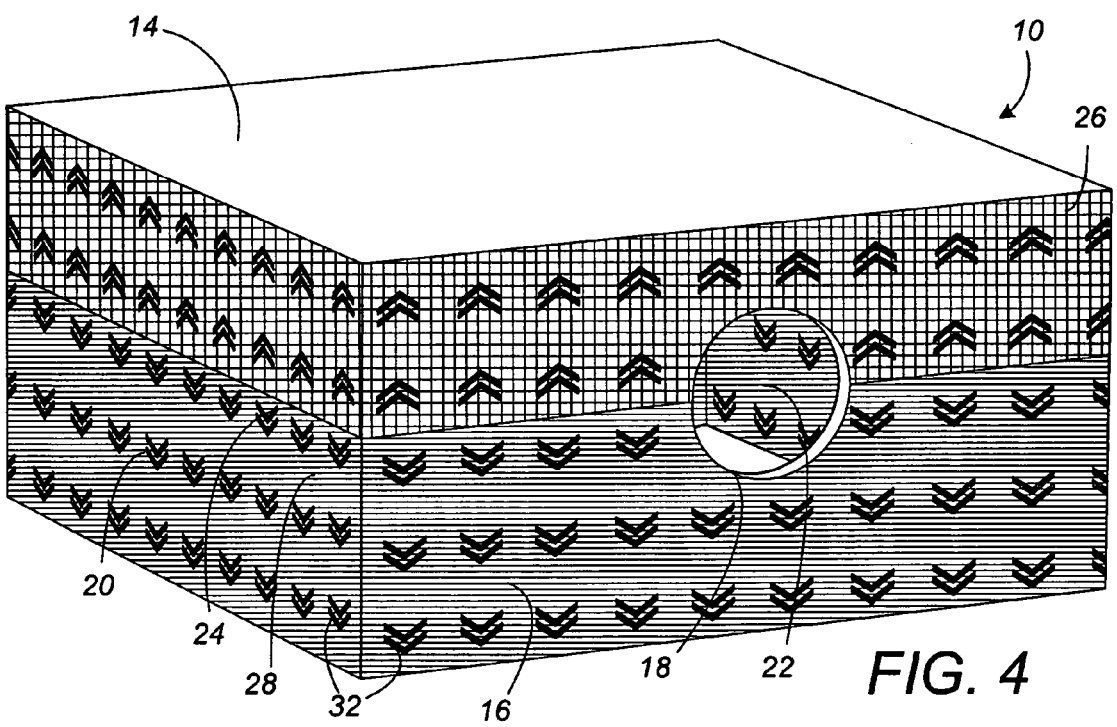
FIG. 4 is a perspective rendering of the box part in accordance with a second embodiment of the present invention.

FIG. 4 is a second embodiment of the invention, which adds an element of color in a simple coloring scheme. As one example, yellow coloring may be applied to faces requiring 0.5 degrees of draft added, orange coloring applied to faces requiring 1.0 degrees of draft added, and blue or purple coloring added to faces requiring an additional 2.0 degrees of draft. In this example of FIG. 4, an additional 2.0 degrees of draft is required on the B side of the mold, sloped inwardly away from the top wall 14. An additional 0.5 degrees of draft is required on the A side of the mold, sloped inwardly toward the top wall 14. Though only portions of the side walls 20, 22 and front wall 16 failed the straight pull manufacturability criterion, the rendering of the part 10 with indicia 32 clearly indicates to the customer what change is needed to the entire face and how to make that change.

Figure 5:
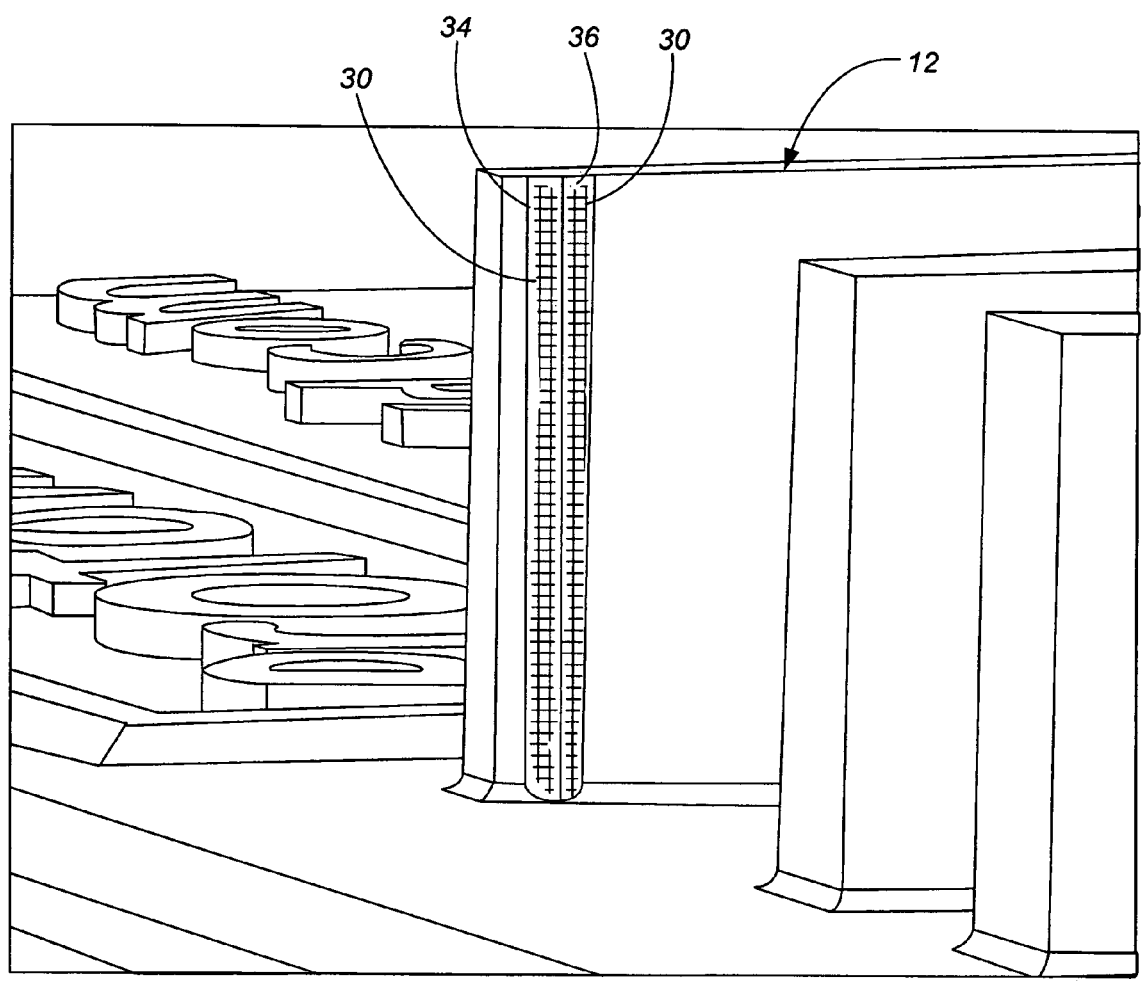
FIG. 5 is a perspective rendering of a labeled part provided by the PROTOMOLD system described and claimed in U.S. Pat. Nos. 6,836,699 and 6,701,200.

FIGS. 5-8 represent examples of the invention on a second labeled part 12. Because the straight pull manufacturing criterion for the molding process may include up to four side actions, molds have a minimum of two directions and up to six different directions in which faces on a part might need to be drafted (draft to the A, B, or any of up to four different side pull directions). Workers skilled in the art will appreciate that more or fewer side actions may be permitted in accordance with the criterion and capabilities established by the moldmaker and software. The prior art rendering of FIG. 5 shows that a problem exists with two faces 34, 36, but leaves the pull direction and the direction of required draft on those two faces 34, 36 ambiguous. An inexperienced customer might not readily appreciate the direction of mold separation, particularly when that separation occurs as the result of a side action.

Figure 6:
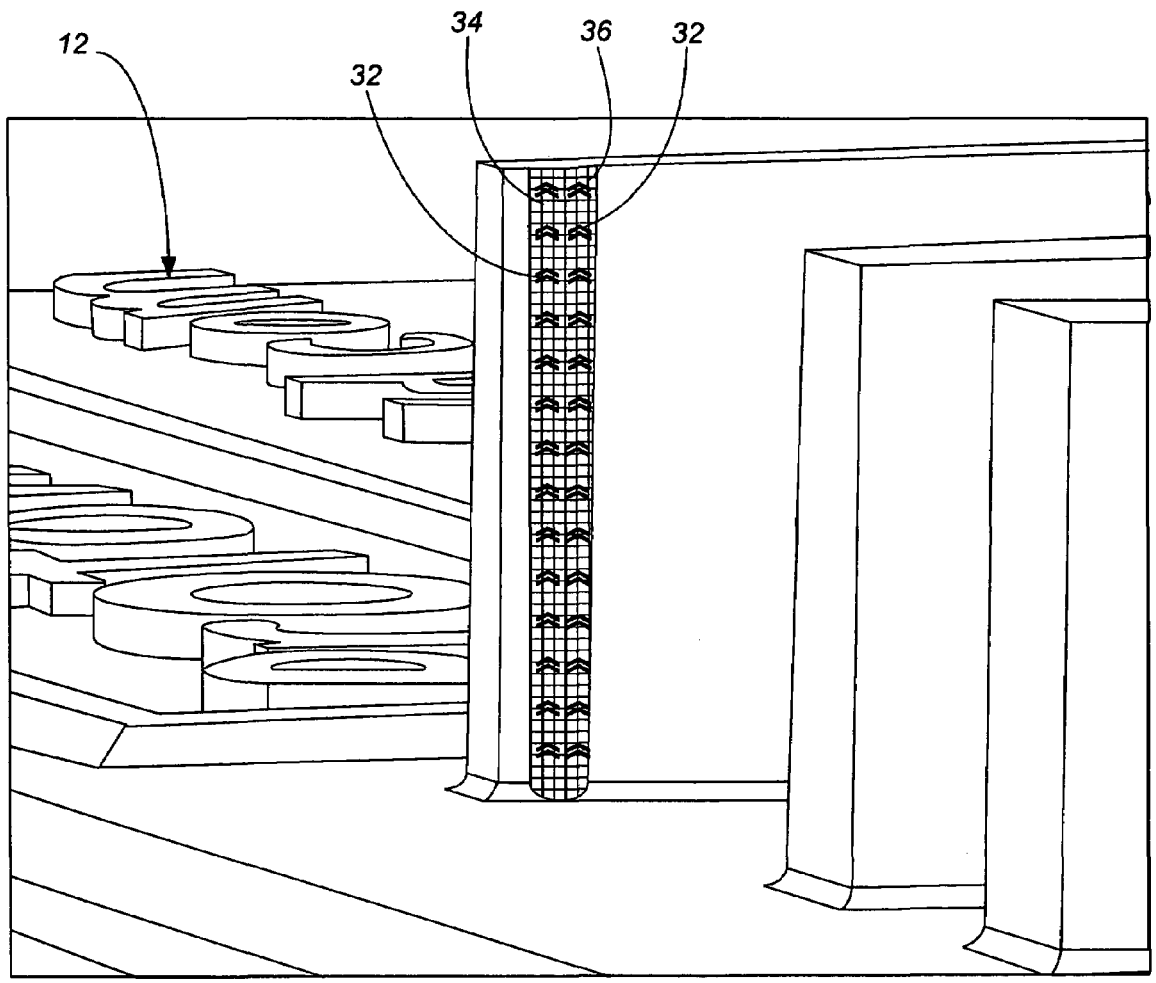
FIG. 6 is a perspective rendering of the labeled part in accordance with the second embodiment of the present invention.

FIG. 6 is a rendering of the same labeled part 12 as rendered in the prior art of FIG. 5, showing the invention. The arrows 32 clearly indicate the direction of pull of each face 34, 36 to which draft must be added. Thus, the faces 34, 36 should be angled, or made to narrow in the direction of the arrows 32.

Figure 7:
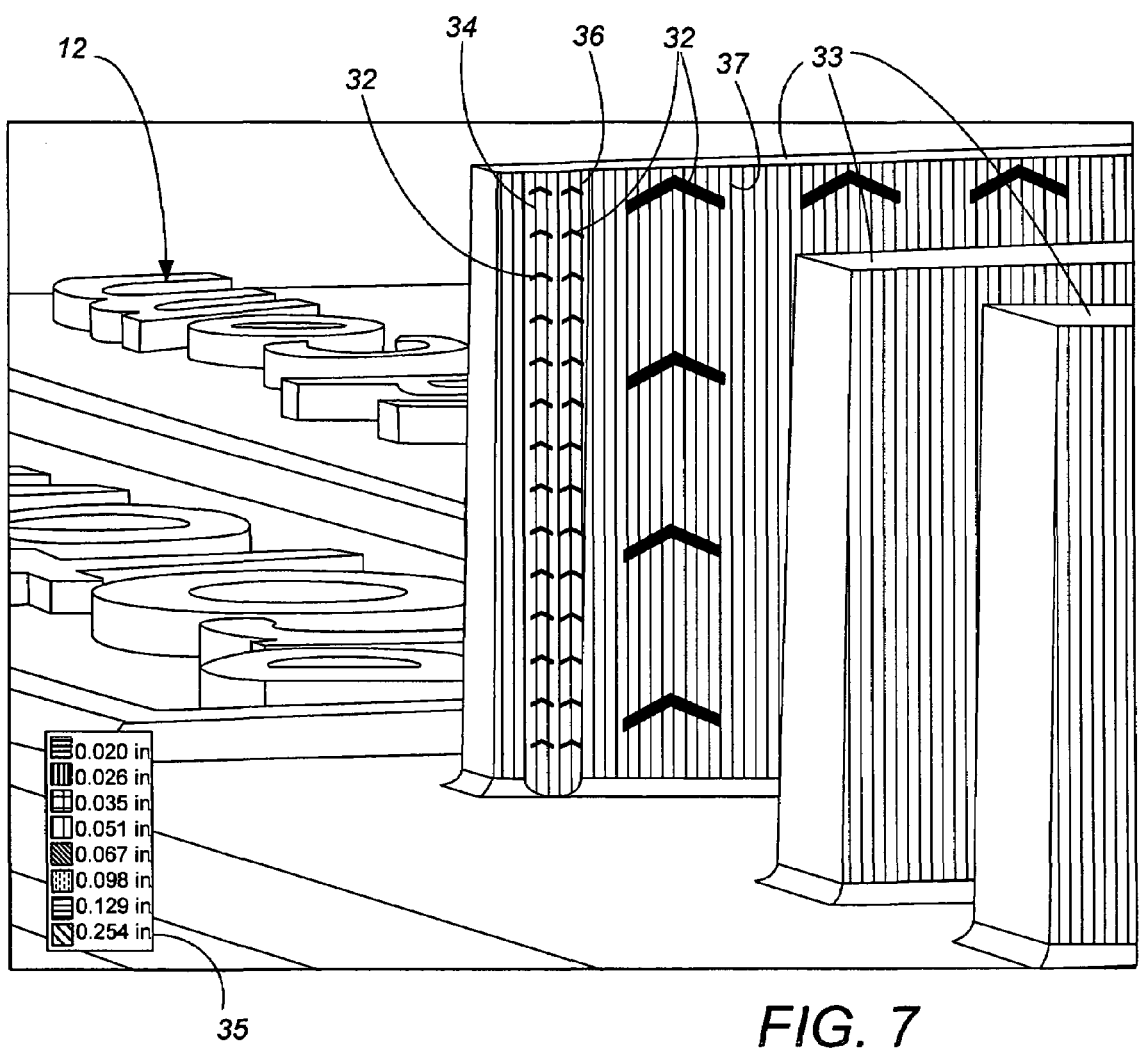
FIG. 7 is a perspective rendering of the labeled part in accordance with a third embodiment of the present invention.

FIG. 7 is a rendering of the same labeled part 12 as rendered in FIGS. 5 and 6, but showing draft added to a wide face 37 as well as to the narrow faces 34, 36. The software selects an appropriate size for the arrows 32 as applied to each face 34, 36, 37 to indicate the direction of pull for that particular face. Because different faces have different sizes (such as face 37 being much wider than faces 34 and 36), the rendering of the part 12 includes arrows 32 of different sizes as applied to those faces 34, 36, 37.

While color may be used in conjunction with the arrows 32 to communicate the amount of draft and direction of draft that is needed, and that the draft needs to be added to the entire face, the arrows 32 may alternatively be used to communicate very different information from the use of color. The embodiment of FIG. 7 demonstrates this feature, wherein color is applied to the rendering not to show amount of draft needed but rather to show the required minimum thickness for the ribs 33. In the embodiment of FIG. 7, the part 12 failed a CNC machining criterion (described further in U.S. patent application Ser. Nos. 10/970,130, 10/325,286 (now issued as U.S. Pat. No. 6,836,699), and Ser. No. 10/056,755 (now issued as U.S. Pat. No. 6,701,200), all incorporated by reference), by having ribs 33 identified as being too tall and narrow (i.e., too deep in the mold cavity) to manufacture with the standard tool set without gouging. The rendering of the part 12 provided back to the customer communicates this failure by applying a color to the ribs 33 which require additional thickness to pass the CNC machining criterion, with the color indicating the minimum thickness for the rib 33. In the preferred embodiment, the following coloring scheme is used:

No color or light gray indicates there is no minimum thickness requirement.

Dark blue indicates the feature must maintain a minimum thickness of 0.020 inches.

Reddish-orange indicates the feature must maintain a minimum thickness of 0.026 inches.

Dark yellow indicates the feature must maintain a minimum thickness of 0.035 inches.

Fuchsia indicates the feature must maintain a minimum thickness of 0.051 inches.

Teal indicates the feature must maintain a minimum thickness of 0.067 inches.

Dull purple indicates the feature must maintain a minimum thickness of 0.098 inches Cyan indicates the feature must maintain a minimum thickness of 0.129 inches.

Green indicates the feature must maintain a minimum thickness of 0.254 inches.

An appropriate color legend 35 is provided to the customer to identify the colors as used. Thus, the fuchsia coloring used in FIG. 7 communicates to the customer that the ribs 33 must be widened to a thickness of at least 0.051 inches in order to maintain their depth. As further described below with reference to FIG. 9, the single arrow pattern indicates the amount and direction of draft to be added to the marked faces.

Figure 8:
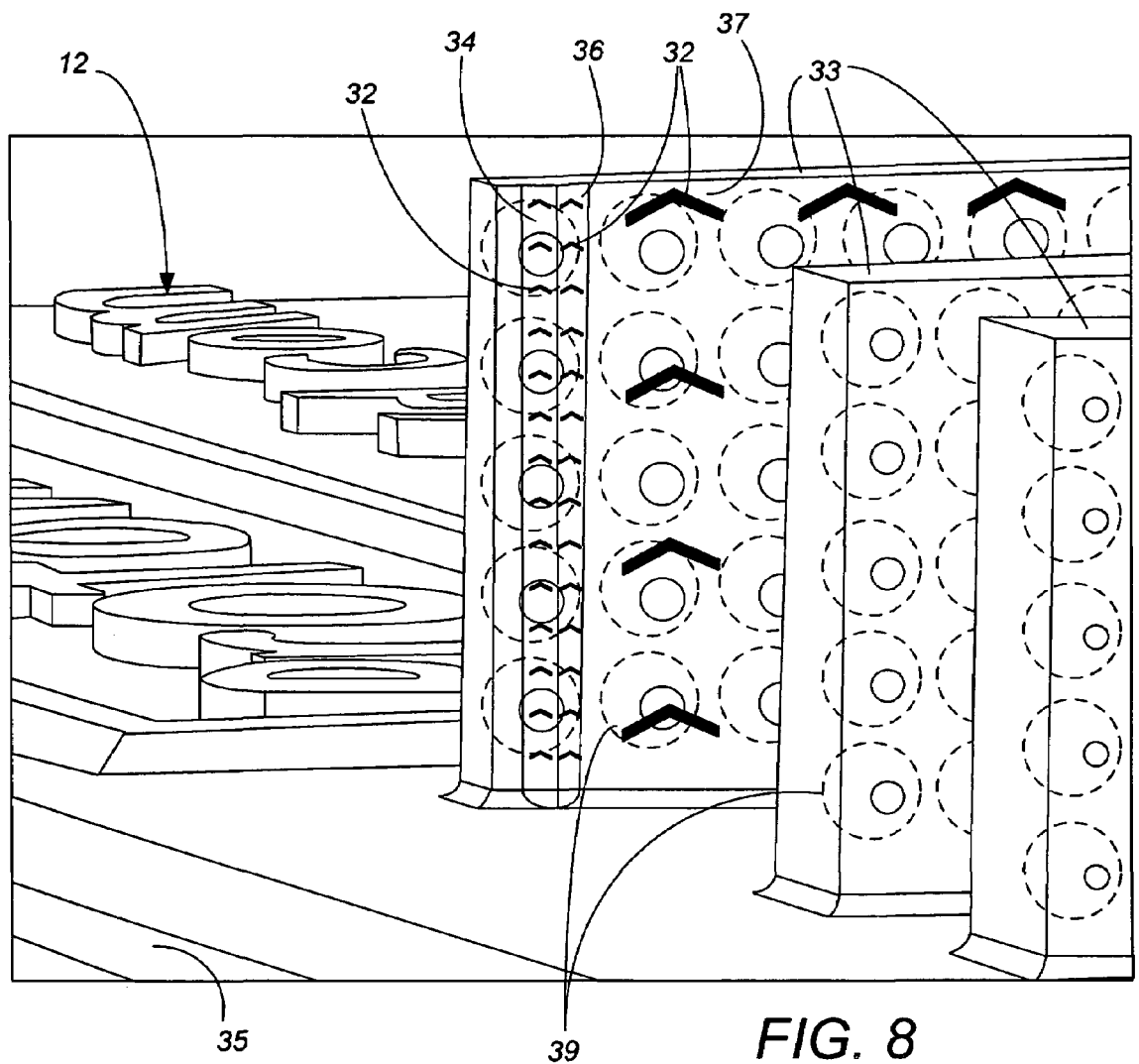
FIG. 8 is a perspective rendering of the labeled part in accordance with a fourth embodiment of the present invention.

Similarly to using arrows 32 rather than color to communicate additional draft needed, other indicia may be used to communicate different types of information to the customer. FIG. 8 represents an embodiment that communicates the same type of information to the customer as FIG. 7, but does so with only indicia rather than with indicia for additional draft needed and with color for the minimum rib thickness requirement. In this case, the indicia added are circles or sphere portions 39 of a diameter to show the additional thickness requirement of each portion of the part. The customer can look at the rendering of FIG. 8, even if provided in 2-D and in black and white, and quickly and intuitively identify that the ribs 33 need to be increased in thickness to a thickness which completely encloses the spheres 39, while at the same time adding draft of an appropriate amount, in the direction indicated, to the faces identified. The circle/spheres 39 can either be applied to the CAD model rendered for the customer as 2-D indicia on the faces of the part or in a 3-D rendering as spheres centered within the ribs 33. Workers skilled in the art will appreciate that the particular indicia selected to communicate any piece of information to the customer may be indicia other than arrows 32 and circles/spheres 39 to most effectively communicate whatever information is desired about the molded part design. As one example, numerical indicia could easily be substituted to indicate the minimum thickness requirement rather than circle/spheres 39. Similarly, workers skilled in the art will appreciate that whether any indicia selected is rendered in 2-D or 3-D onto the part can be decided within the context of the CAD information provided back to the customer to best communicate the information desired.

The labeled part 12 in FIGS. 5-8 exemplifies a common feature found in a fairly large number of customer parts. Namely, many parts have multiple, adjacent tall, narrow faces formed by the same pull direction, such as faces 34, 36. If desired to avoid having to make the arrows 32 very small to fit on the narrow faces individually, the software system may alternatively draw larger arrows (not shown), each of which extends over all the adjacent tall, narrow faces formed by the same pull direction.

There are actually several changes made between the prior art system and software and the system and software of the present invention. Firstly, the software analyzes the locations that fail one or more criteria on the mold, and associates those locations with the face(s) which include such locations. Faces are defined not only based upon edges of the part 10, 12, but also based upon parting lines 24 between the A side, B side and any side actions on the mold. For instance, the box part 10 of FIGS. 1-4 includes twelve faces identified as requiring correction: each of four side walls 16, 20, 22 includes a B side interior face, an A side exterior face and a B side exterior face all requiring additional draft in the proper direction. The software then identifies and applies decals 32 and/or color to the entire face, not just portions of it.

Second, the software further identifies the pull direction for each face requiring corrections. The software orients the decals 32 on the face in the direction of pull for that face.

Third, the software selects an appropriate size for the indicia or decal 32 which corresponds to the size of the face requiring correction. In the preferred embodiment, a single size of decal is retained in CAD file memory. The software then selects an appropriate scale factor to apply to that one image, so that in the smallest direction of the face, at least one indicia is visible. For directions of the face greater than 0.25", the software attempts to scale and/or space decals adjacent in that direction so as to display an integral number of indicia while keeping the scale factor within reason. Alternatively, several different sizes of decals can be retained in CAD file memory. The software analyzes or measures the length and width of the face requiring correction, and selects a size of decal 32 which will fit entirely within the minimum length/width measurement. The decal 32 is then repeated in length and in width to populate the entirety of the face requiring direction.

Fourth, the software orients the decals 32 in accordance with the direction of the face to which each decal 32 is applied. This is readily done in 3-D CAD software. It is exemplified in the rendering of FIGS. 3 and 4 as all the chevron/arrows 32 are viewed as having an identical size, being arranged in a square pattern that runs in the direction of each face. As the part 10 is manipulated on screen in the 3-D CAD software package, the symbols 32 move (in size, shape and orientation) with the faces to which they are applied.

Finally, the software includes an addition of further levels of corrections required, such as the addition of a "2.0 degree additional draft needed" designation. Because the decals 32 can more clearly communicate what correction is required, additional levels of detail can be provided to the customer in a single rendering without being overly confusing.

The application of these software changes differs slightly based upon which further information is being provided to the customer. Thus, the size of the spheres 39 is not selected to match the size of the face to which they are applied, but rather to match the minimum thickness requirement for that particular rib 33. Similarly, because the minimum thickness requirement does not have an associated up or down direction, there is no need to orient the spheres 39 in any particular direction on the part rendering.

Figure 9:
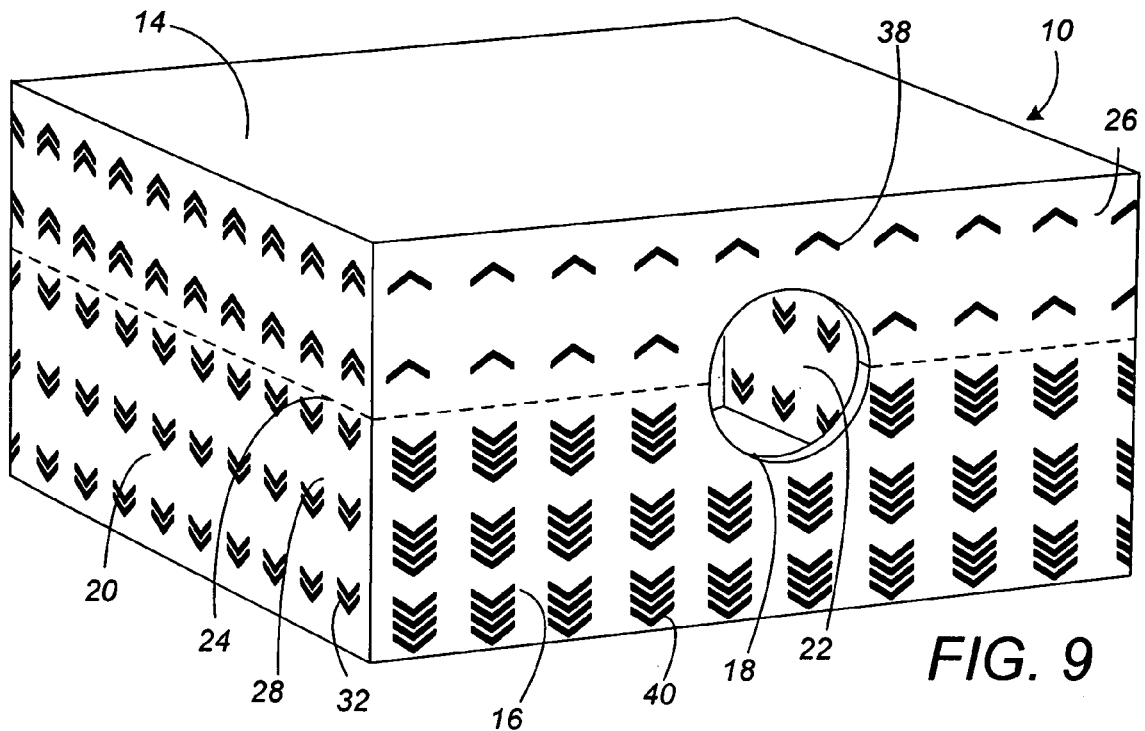
FIG. 9 is a perspective rendering of the box part in accordance with a fifth embodiment of the present invention.

FIG. 9 shows a fifth embodiment of the present invention, which uses the number of arrows or chevrons 32, 38, 40 (rather than color) to indicate the amount of draft needed to be added. Thus, the rendering of FIG. 9 indicates that the A side, exterior face of the front wall 16 requires 0.5° of draft added by applying a single arrow pattern 38. The B side, exterior face of the front wall 16 requires more draft to be added, such as 2° draft added, by applying a four arrow pattern 40. The side walls 20, 22 require 1° draft added, shown by applying a double arrow pattern 32. By using different indicia or different patterns of indicia on different faces, more information can be communicated to the customer. The embodiment of FIG. 9 is preferred over the embodiment of FIG. 4 particularly in situations when color is not readily transmitted, such as when using a black and white photocopy or a facsimile transmission of the changes required of the part 10. Even in situations when color is available, the embodiment of FIG. 9 more quickly communicates the required action, e.g., the customer need not reference a color coded explanation table to appreciate that the B side, exterior face of the front wall 16 requires four times as much additional draft as the A side, exterior face of the front wall 16.

Figure 10:
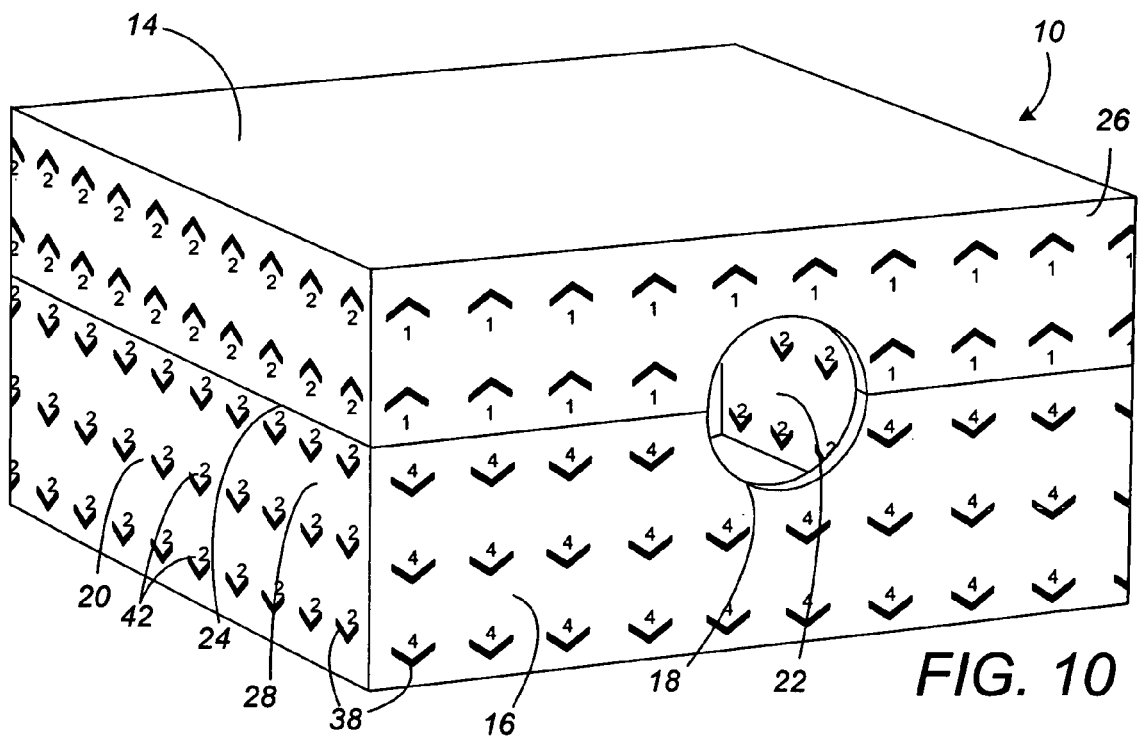
FIG. 10 is a perspective rendering of the box part in accordance with a sixth embodiment of the present invention.

FIG. 10 demonstrates a sixth embodiment, which is similar to the embodiment of FIG. 9. In this sixth embodiment, the amount of additional draft required is provided by numerical indicia 42 rather than the number of chevrons. At the same time, the arrows applied as decals 38 directly to the rendering of the part 10 communicate direction much more effectively than mere numbers or words without a shown direction. The embodiment of FIG. 10 can thus be viewed like a vector model, wherein the indicia 38, 42 applied to the box part 10 show both magnitude and direction of the correction needed.

If, after seeing the changes as communicated such as shown in FIGS. 3, 4 and 6-10, the customer decides to order the part, then the final step in the preferred process is manufacturing the changed part by the manufacturing process, such as machining a mold and running the number of pieces ordered by the customer in an injection mold press. The manufactured part(s) are shipped or otherwise provided back to the customer.

Use of the invention to show draft direction is very beneficial because the added amount of draft is almost always too small (typically 2° or less) to readily see just by correcting the profile of the part 10. That is, many inexperienced customers will not quickly recognize any difference between renderings of the box parts 10 with and without the necessary draft. Although this new feature of applying "decals" 32, 38, 40, 42 to faces has been implemented to show draft direction, the invention isn't limited to just that usage. The concept of systematically applying indicia directly to a rendering of the part to provide the customer with additional information regarding molding of the custom part has applicability in communicating a wide variety of information. As one example, indicia can be applied to faces of the part to show surface finishing at that particular location of the part.

Figure 11:
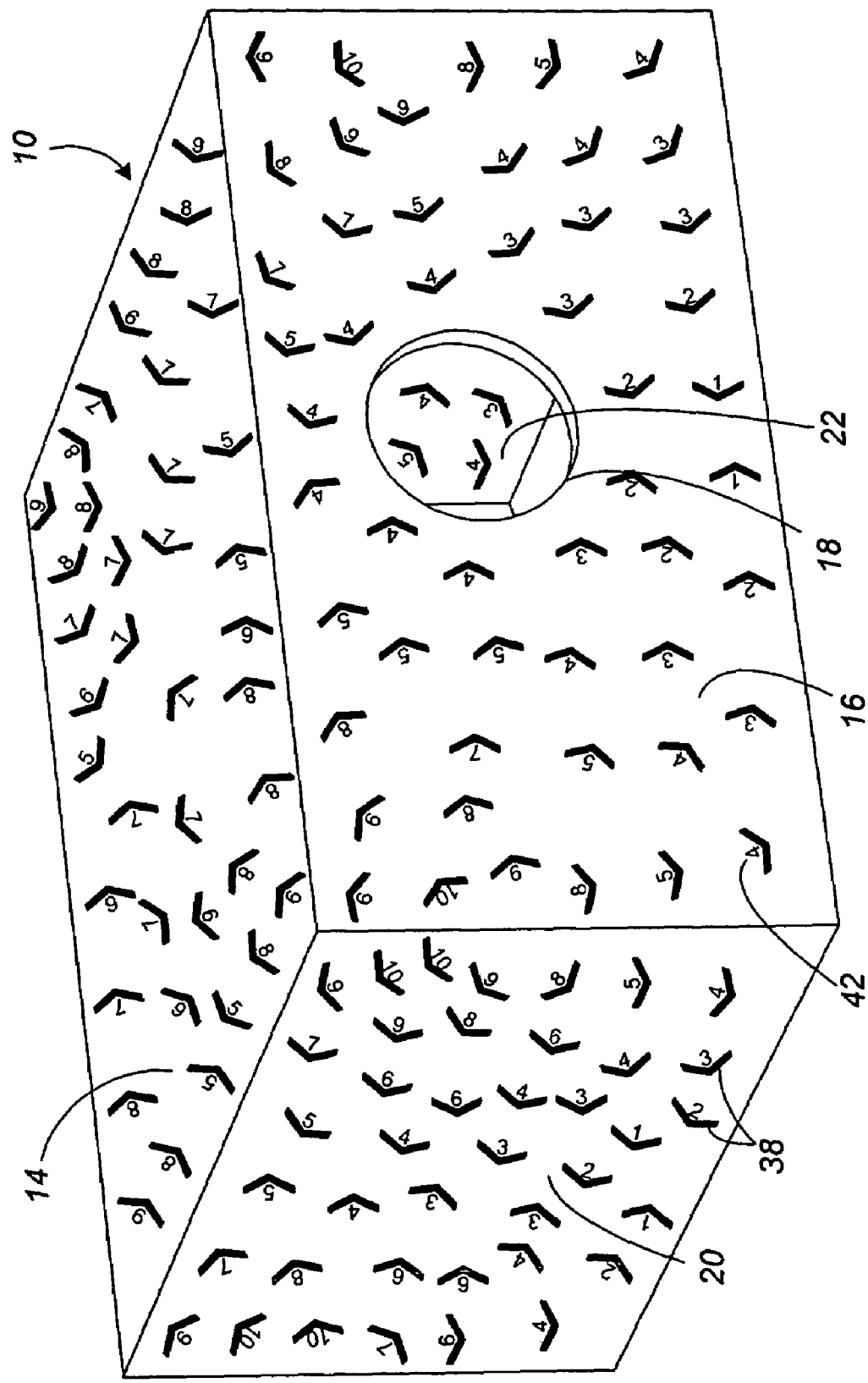
FIG. 11 is a perspective rendering of the box part in accordance with a seventh embodiment of the present invention.

The wide range of types of information which can be communicated with the present invention also has application when the part is analyzed for properties which are not merely spacial, i.e., analyzed beyond the x, y and z dimensions of the part. For example, pressure, temperature and flow direction are all properties which change as a function of time at different locations within the part during molding. When properties such as these are analyzed, the present invention has application in communicating the analysis to the customer. FIG. 11 shows such an embodiment. In FIG. 1, the direction of the arrows 38 indicates a last flow direction and the number 42 shown indicates a time step of solidification during molding (i.e., the first places in the shot to solidify are marked with a "1", the next places in the shot to solidify are marked with a "2", etc.). Such information can be vitally important in more detailed modeling of what the final part will look like to understand weld lines in the part (identified by where arrows oppose each other) or solidification orientation, for instance, if the resin is not directionally homogeneous (such as by containing needle-shaped fill particles which orient themselves in line with the direction of flow). Thus, the present invention can be used to communicate time-dependent changes and directional information across the different x, y and z locations of the part, in ways not possible through the prior art.

While the preferred embodiments use chevron shaped arrows to communicate directional information, it should be recognized that a wide variety of other shapes, symbols and indicia could alternatively be used. The key aspects to consider when selecting an alternative symbol are that the symbol should be readily reproduced both in color and in black and white renderings, and that the symbol need be clearly and readily distinguishable from any part features of actual part geometries. The present invention is primarily intended to communicate with customers of varying experience levels, and the intent is to communicate as rapidly and as clearly as possible with all such customers, avoiding any confusion as to whether the symbol represents a feature visible on the final part. Directional, magnitude and time-based information should be communicated as naturally as possible (such as is done directionally through the preferred use of arrows and magnitudinally through the preferred use of spheres/circles).

Although the present invention has been described with reference to preferred embodiments, workers skilled in the art will recognize that changes may be made in form and detail without departing from the spirit and scope of the invention.

The invention claimed is:

1. A process of communicating with a customer with regard to changes required to be made to a customer's part design for manufacturability by a manufacturing process, comprising:
    analyzing the customer's CAD file for the custom part to be manufactured;
    providing a part rendering to the customer based upon the analysis, the provided part rendering including one or more symbols placed on a face of the part rendering indicating changes to part geometry from the part geometry of the customer's CAD file to assist in manufacturability of the part and/or mold.

2. The process of claim 1, wherein the symbols indicate direction.

3. The process of claim 2, wherein the symbols indicate direction of additional draft needed on that face.

4. The process of claim 1, wherein the symbols indicate magnitude.

5. The process of claim 4, wherein the symbols indicate the magnitude of additional draft needed on that face.

6. The process of claim 1, wherein the part comprises faces, and wherein the symbols are applied to one or more but less than all of the faces of the part.

7. The process of claim 1, wherein the manufacturing process is injection molding.

8. The process of claim 7, wherein the part comprises faces which are separately defined based upon parting lines between A side, B side and any side actions of the mold, and wherein the symbols are applied to one or more faces of the part.

9. The process of claim 1, wherein the CAD file is analyzed by a computer and the part rendering is provided to the customer by a computer.

10. The process of claim 9, wherein the size of a symbol is computer selected to correspond with the size of a face to which the symbol is applied in the rendering provided to the customer.

11. The process of claim 1, wherein the part rendering provided to the customer is a three-dimensional rendering which is manipulatable by the customer, with the symbols placed on a face of the part being manipulatable with the three-dimensional rendering of the part.

12. The method of claim 1, further comprising:
    manufacturing the changed part by the manufacturing process; and
    providing the manufactured part to the customer.

13. The method of claim 1, wherein the analyzing is performed with a computer processor.

14. The method of claim 1, wherein the customer can view the part rendering.

15. A process of communicating with a customer with regard to changes required to be made to a customer's part design for manufacturability with a manufacturing process, comprising:
   analyzing a customer's CAD file of a custom part to be manufactured, the analysis identifying portions of faces which require changes from the customer's CAD file for manufacturability reasons;
   providing a part rendering to the customer based upon the analysis, the provided part rendering including identification of entire faces which need to be changed from the customer's CAD file even though just portions of the face failed the manufacturability analysis.

16. The process of claim 15, wherein the identification includes symbols applied to the entire faces which need to be changed.

17. The process of claim 16, wherein the symbols indicate direction.

18. A process of communicating with a customer with regard to injection molding of a customer's part design, comprising:
   analyzing a customer's CAD file for a custom part to be injection molded;
   providing a part rendering to the customer based upon the analysis, the provided part rendering including a plurality of symbols placed on a face of the part, with the symbols indicating direction at particular locations on the part.

19. The process of claim 18, wherein the symbols indicate magnitude at particular locations on the part.

20. The process of claim 19, wherein the magnitude indicated is the magnitude of additional draft needed for manufacturability.

21. The process of claim 18, wherein the direction indicated is the direction of additional draft needed for manufacturability.

22. A computer program for assisting customers with designing injection molded parts, the computer program comprising:
   an input dedicated for receiving a customer's CAD file, the CAD file defining a shape of a part to be molded;
   computer code recorded on a computer-readable medium for analyzing the customer's CAD file for injection molding; and
   an output providing a CAD rendering of the part, the CAD rendering including a plurality of symbols placed on one or more faces of the part, with each symbol indicating a direction associated with the injection mold process at a particular location on the part.

* * * * *